June 13, 1967 H. C. RHODES 3,324,809
DOUGH COMPRESSING AND DIVIDING DEVICE
Filed Oct. 15, 1962 2 Sheets-Sheet 1
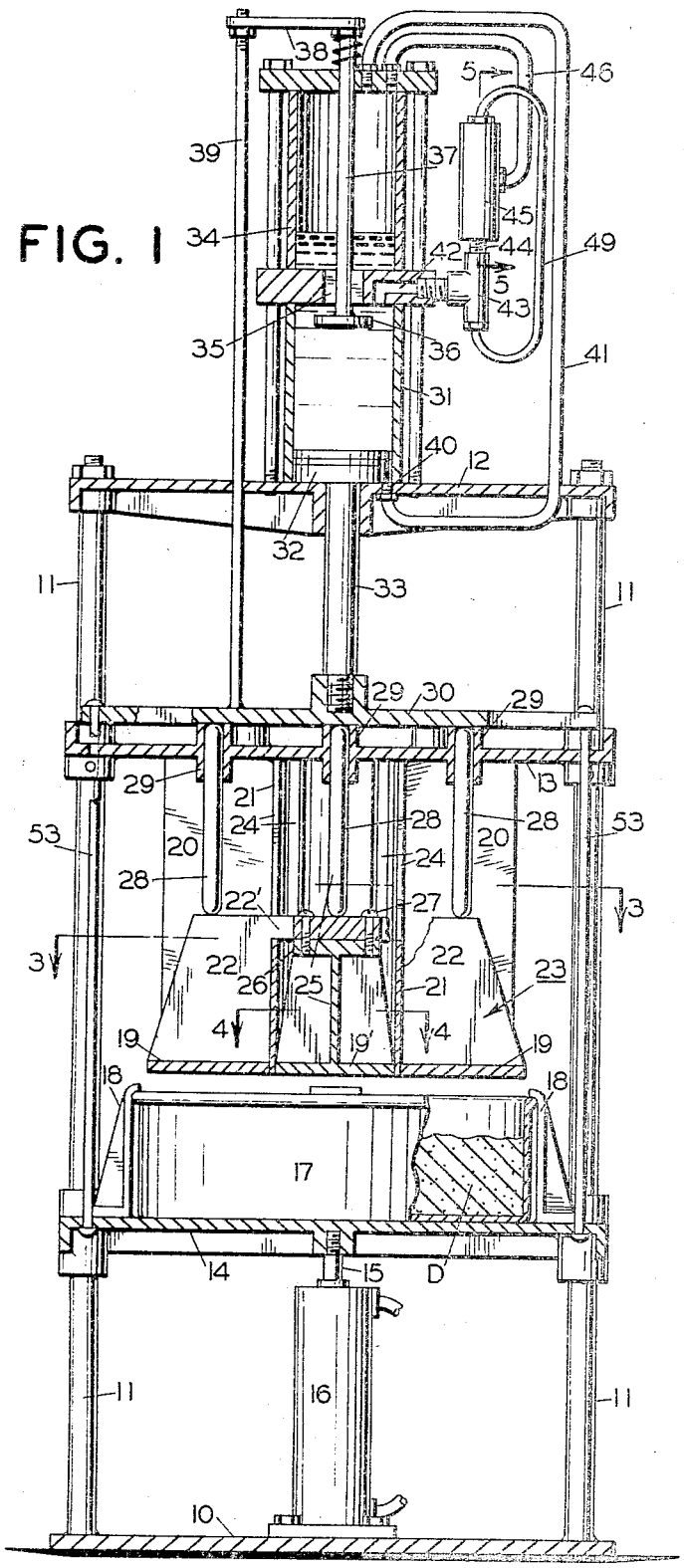
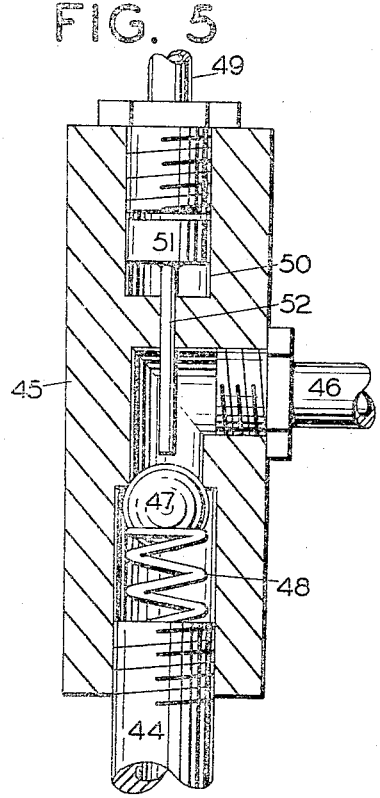
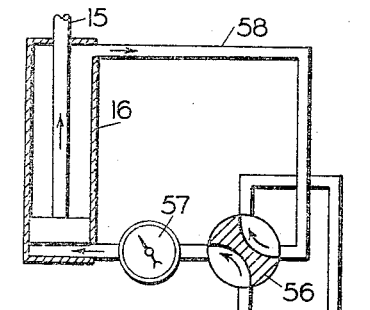
INVENTOR.
HERBERT C. RHODES
BY *F. N. Geisler*
ATTORNEY

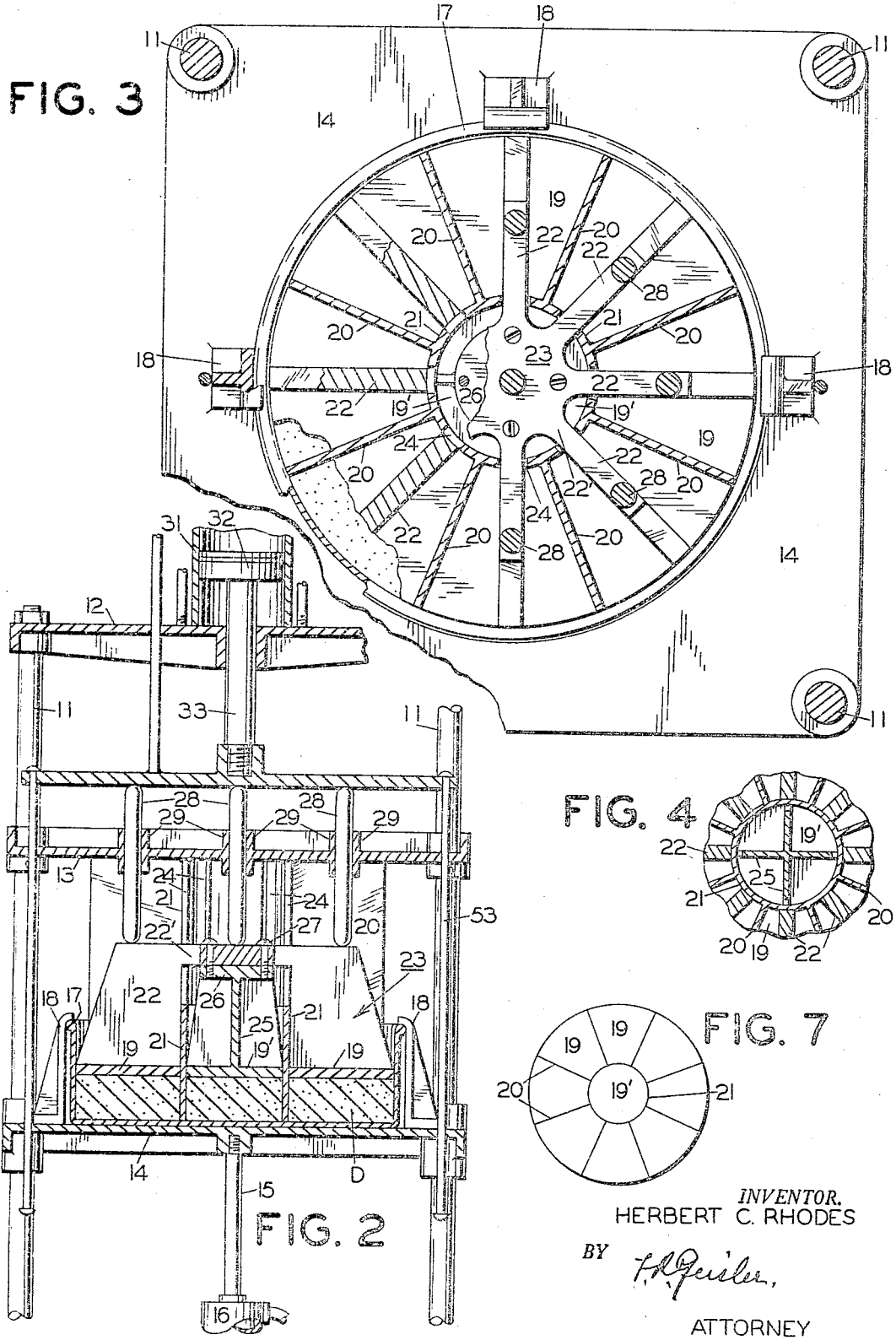

United States Patent Office 3,324,809
Patented June 13, 1967

3,324,809
DOUGH COMPRESSING AND DIVIDING DEVICE
Herbert C. Rhodes, 10106 SE. Stark St.,
Portland, Oreg. 97216
Filed Oct. 15, 1962, Ser. No. 230,412
6 Claims. (Cl. 107—68)

The principal object of this invention is to provide an improved device which will divide a predetermined mass of dough into exactly equal portions, that is, into portions of exactly the same weight or mass.

A major problem in modern commercial bakeries producing loaves of bread, for example, in large quantities, is to be able to have each completed loaf of exactly the right specified weight. The bakery incurs a serious liability when a loaf sold is underweight. On the other hand when loaves sold are overweight the bakery suffers a loss which could become appreciable in large scale production. The difficulty in having each loaf of bread, or other bakery product, of exactly the desired right weight is caused by the difficulty of dividing a mass of dough into portions of exact amount, and a very slight difference in the size or mass of the individual dough piece will make an important difference in the weight of the finished products.

It is also well known that in the dividing or cutting of dough into separate portions there is a tendency for the dough to shrink or move away from the cutting instrument, which is caused largely by the release of pressure which takes place as part of the cutting operation. The presence of gas in the dough aggravates the difficulty. I have discovered, however, that when steady continuous pressure is maintained on the dough during the entire cutting or dividing operation, much greater accuracy of division is possible.

Accordingly a further related object of the present invention is to provide a novel device in which the dough to be divided will be subjected to substantial pressure during the cutting or dividing operation and in which such pressure will be constantly maintained until the division of dough has been completed.

Another specific object of the invention is to provide a device for compressing and dividing a mass of dough into desired equal portions, which device will be simple and practical in construction and easy to operate and maintain in operable condition, in addition to being highly reliable.

The manner in which the above mentioned objects and other incidental advantages are attained, and the construction and operation of the device of the present invention will be briefly described and explained with reference to the accompanying drawings, wherein:

FIG. 1 is a sectional elevation of the dough compressing and dividing device showing a pan of dough in place in the device preparatory to the starting of the dough compressing and dividing operation;

FIG. 2 is a fragmentary sectional elevation, corresponding in part to FIG. 1, but showing the device at the completion of the operation;

FIG. 3 is a section taken on the line indicated at 3—3 in FIG. 1, drawn to a larger scale, with portions broken away for clarity;

FIG. 4 is a fragmentary section on line 4—4 of FIG. 1;

FIG. 5 is a fragmentary section on line 5—5 of FIG. 1 drawn to an enlarged scale;

FIG. 6 is a diagram showing the control for the hydraulic cylinder and piston by which the device is operated; and FIG. 7 is an illustration showing the resulting division of the original mass of dough.

Referring first to FIG. 1, the device has a base 10 to which are secured four vertical guide and supporting rods 11. A stationary reinforced top plate 12 is secured on the top ends of the rods 11. An intermediate stationary plate 13 is also firmly secured on the rods 11 in the location shown. A movable pan-supporting platform 14 is slidable on the rods 11. This platform is supported at the center on the piston rod 15 of a piston in a hydraulic bottom cylinder 16, which operates the device, as later explained.

In the particular device illustrated the dough to be compressed and divided is placed in a circular pan 17, the dough being indicated by the reference D. Preparatory to the compressing and dividing of the dough the pan 17, with the dough contained therein, is set in place on the pan-supporting platform 14 and is held firmly in the proper position on this platform 14 by a plurality (preferably three as shown in FIG. 3) of pan-holding brackets 18, which prevent any relative shifting of the pan out of position on the platform 14 regardless of the up and down movement of the platform.

An annular dough-compressing plate (FIG. 1) is mounted above the platform 14. The outer periphery of this annular compressing plate 19 has substantially the same diameter as the inner periphery of the cylinder wall of the pan 17. This annular plate 19 is divided into equal sections by radial slots extending from the inner circular periphery to the outer circular periphery. In the device as illustrated there are eight such sections (see FIG. 3 and also FIG. 7). The radial slots through the annular plate 19 accommodate stationary blades or knives 20 of rectangular shape which extend in vertical radially-positioned planes and which are rigidly secured at the top ends to the stationary plate 13 and extend downwardly therefrom.

A stationary cylindrical knife 21, having a vertical axis which coincides with tthe center of the annular plate 19, also is secured at its top end to the stationary plate 13. The bottom or cutting edge of this cylindrical knife is located in the same horizontal plane as the bottom or cutting edges of the rectangular knives 20. The inside vertical edges of the knives 20 are attached to the outer cylindrical wall of the cylindrical knife 21.

A plurality of vertical radially-extending ribs 22 on the top of the annular plate 19 are formed into a supporting spider assembly 23 for the sections of the annular plate 19, there being one such rib for each of the sections into which the plate 19 is divided. These ribs extend upwardly from the center line of each section, as shown in FIG. 3. The inside edge of these vertical ribs 22 of the plate-supporting spider assembly 23 are vertical for a substantial distance and slide up and down on the outside of the stationary cylindrical knife 21 with a slight clearance. Near the top ends of these vertical inside edges the ribs 22 have portions 22' which extend radially inwardly, passing through vertical slots 24 (FIG. 3) in the wall of the stationary cylindrical knife 21, and are integrally joined at the center or hub portion of the spider assembly 23 which is located within the stationary cylindrical knife 21. The bottom ends of the vertical slots 24 in the wall of the cylindrical knife 21 limit the extent to which the spider assembly 23, and therewith the dough compressing plate assembly 19, can drop downwardly from the stationary plate 13. In FIG. 1 the plate assembly 19 is shown at its lowest position, and in this lowest position the bottom or cutting edges of the stationary rectangular knives 20 and of the stationary cylindrical knife 21 will be substantially in the same horizontal plane as the plate assembly 19.

In order to complete the dough compressing plate assembly 19 a circular complementary plate 19', having a periphery of substantially the same diameter as the interior of the cylindrical knife 21, is positioned within the cylindrical knife and located in the same horizontal plane as the sectioned annular compressing plate 19. This circular inner compressing plate section 19' is provided with ribs 25 which extend upwardly and terminate in an integral disc 26 which is secured to the central or hub portion of the spider assembly 23 by bolts 27.

As will now be apparent, the dough compressing assembly, including the sections into which the annular plate 19 is divided and the complementary inner circular plate 19', and including the mounting spider assembly 23, is slidable upwardly to a limited extent with respect to the stationary knives 20 and 21 from the lowered or starting position shown in FIG. 1. In the particular device illustrated the eight sections into which the annular plate assembly 19 is divided, and the circular inner plate section 19', are all exactly of the same area. In other words, the stationary rectangular knives 20 and the cooperating stationary circular knife 21 are so arranged as to cut the dough D in the pan 17 into nine portions with all the dough portions restricted to spaces which extend over exactly the same area.

The cutting or dividing of the dough D in the pan 17 is accomplished by having the pan-supporting platform 14, and therewith the pan 17 and the dough D, moved upwardly while the knives 20 and 21 remain stationary. Upward movement of the platform 14 is caused by operation of the hydraulic piston in the hydraulic cylinder 16. to be referred to later. As the dough is moved upwardly it is brought into contact with the dough compressing plates 19 and 19'. Then further movement of the dough results in predetermined pressure being constantly exerted on the dough while the dough is forced up against the stationary knives, until the bottom edges of the knives are at the bottom of the pan 17, as illustrated in FIG. 2.

As previously mentioned, the spider assembly 23, by which the dough compressing plates 19 and 19' are supported, is upwardly slidable in the vertical slots 24 provided in the stationary cylindrical knife 21. A plurality of thrust rods 28 are slidably mounted in bearing sleeves 29 mounted in the intermediate stationary plate 13 (FIGS. 1 and 2). The lower ends of these rods 28 rest on the spider assembly 23. The tops of these rods engage the underside of a thrust plate 30 which is slidable on the vertical frame rods 11.

A hydraulic cylinder 31 is centrally mounted on the stationary top plate 12 (FIG. 1). A piston 32 in the cylinder 31 has a downwardly extending piston rod 33 which is slidable in a suitable bearing provided in the stationary plate 12 and the bottom end of this piston rod is secured to the thrust plate 30. A hydraulic fluid reservoir 34 is located above the cylinder 31 and is directly connected with the cylinder 31 by a port 35 in the head of the cylinder 31. A valve member 36 is mounted on the bottom of the valve stem 37 which extends upwardly through the port 35 and through the top of the reservoir 34 and is secured to an arm 38 mounted on the upper end of a valve control rod 39. The bottom end of the valve control rod 39 is secured to the thrust plate 30. As apparent from FIG. 1, the arrangement is such that when the spider assembly 25, and therewith the thrust plate 30, and therewith the piston 32 in the hydraulic cylinder 31, are in the lowermost positions, shown in FIG. 1, the valve 36 will be opened, allowing hydraulic fluid from the reservoir 34 to pass freely into the cylinder 31 and fill the cylinder above the piston 32. However, as the thrust plate starts to be moved upwardly the valve 36 will close and prevent any passage of the hydraulic fluid back through the port 35. The cylinder 31 is provided with a bottom discharge port 40 which is connected by a conduit 41 with the top of the reservoir 34.

A pressure controlled outlet port 42 in the top of the cylinder 31 leads to a T connection 43. A conduit 44 (FIGS. 1 and 5) leads from the top of the T connection 43 into a channel in the housing 45 and a reduced diameter portion of the channel is connected with an upper conduit 46 which leads from the housing 45 to the top of the reservoir 34. A ball valve 47 (FIG. 5) is normally held in the closed position, shown in FIG. 5, by the spring 48, thus normally preventing passage of hydraulic fluid through the conduits 44 and 46, but such passage is enabled to take place when the ball 47 is pressed downwardly against the force of the spring 48.

A second conduit 49 leads from the T connection 43 into the top of an auxiliary control cylinder 50 located in the top of the housing 45. A piston 51 in the cylinder 50 has a piston rod 52 which is slidably mounted in the bottom of the cylinder 50 in the housing 45 and is so arranged as to engage the ball 47 and press it downwardly against the force of its spring 48 when hydraulic fluid pressure in the auxiliary control cylinder 50 above the piston 51 becomes sufficiently great. The area of the piston 51 is greater than the effective area of the ball valve 47 so that the hydraulic unit pressure on top of the piston 51 will be greater than the unit hydraulic upward pressure available against the ball 47. Thus when the difference between these opposed pressures exceeds the force exerted by the spring 48, the ball 47 will be pressed downwardly enabling hydraulic fluid temporarily to pass through the conduits 44 and 46.

It will now be apparent from FIGS. 1 and 5 that, when the compressing plates 19, 19', and therewith the thrust plate 30, piston rod 33 and piston 32 are thrust upwardly, the hydraulic fluid in cylinder 31 will offer continued resistance, which resistance, depending upon the upward thrust exerted, can be maintained constantly during such upward movement as the hydraulic fluid in cylinder 31 above the piston 32 is allowed to pass out through outlet port 42 and finally through the upper conduit 46 into the upper reservoir 34. The movable pan-supporting platform 14 is connected with the thrust plate 30 by a plurality of limiting tie rods 53 (FIGS. 1 and 2) which are slidable in bearings in the platform 14, but which cause the thrust plate 30 to move down to the starting position shown in FIG. 1 when the platform 14 is returned to starting position.

The raising and lowering of the pan-supporting platform 14, as previously indicated, is accomplished by the hydraulic cylinder and piston 16. The manner in which this takes place is illustrated diagrammatically in FIG. 6. In FIG. 6 the hydraulic fluid supply reservoir for the cylinder 16 is indicated at 54. Operation of an electrically operated pump P causes hydraulic fluid to be delivered through the conduit 55 and valve 56, and, when the valve 56 is in the position shown in FIG. 6, into the bottom of the cylinder 16. A pressure gauge 57 is interposed in the conduit 56 to enable the operator to govern the amount of upward pressure being delivered on the pan-supporting platform 14. The manner in which this simple hydraulic system operates, as illustrated in FIG. 6, is self-explanatory.

When the dough D has been placed in the pan 17 and the pan 17 has been secured in position on the platform 14, the device being in the starting position shown in FIG. 1, the operator closes a switch (not shown) to the pump P (FIG. 6) with the valve 56 turned to the position shown. The resulting upward movement of the piston in cylinder 16, and therewith the upward movement of platform 14, pan 17, and dough D, brings the top of the dough into contact with the dough-compressing plates 19, 19'. This contact of the dough with the plates 19, 19' flattens out the dough and causes the dough to be brought to uniform height throughout the pan. Continued upward movement of the pan 17 and dough causes the dough to thrust the plates 19, 19' upwardly, this upward movement of the plates 19, 19' taking place in opposition to the resistance offered by the hydraulic piston 32, which resistance will be maintained constantly at desired predetermined pressure during the operation since, as previously explained, the discharge of hydraulic fluid through the port 42 will take place only when the pressure is sufficient to cause the ball valve 47 (FIG. 5) to be opened and will continue only while this pressure is maintained. As the dough moves upwardly it moves against the stationary knives 20 and 21 until the bottom edges of these knives reach the bottom of the pan 17 and the division of the dough mass into the nine equal parts has been completed. Then, with the reversing of the valve 56, the device is returned to starting position. Thus during the entire cutting or dividing of the dough mass into the smaller pieces of equal area the dough is maintained under constant compression, which, as previously explained, insures greater accuracy in the division of the given quantity of dough into the desired number of smaller pieces, each of identical mass.

While the device illustrated and described shows a round dough pan and a corresponding particular arrangement of stationary knives and dough compressing plates, obviously other shapes of dough pans with differently arranged knives and differently shaped dough compressing plates could be used in the carrying out of the invention. Also further minor modifications would be possible without departing from the principle of the invention. It is not intended to limit the invention otherwise than is set forth in the claims. However, the device, constructed as shown and described above, has been found to be very satisfactory in actual use and therefore such device is considered the preferred means for the carrying out of the invention.

I claim:

1. In a dough compressing and dividing device, a container for dough, said container having an open top, a pressure plate assembly positioned above said dough container and adapted to press down on the dough in said container while covering the area within said container, a knife assembly above said container, said knife assembly so arranged as to divide the dough in said container into sections of equal area when said container with said dough and said knife assembly are moved relatively towards each other, said pressure plate assembly having slots for said knife assembly enabling said knife assembly to pass through said pressure plate assembly, means for moving said dough container and said knife assembly relatively towards each other, whereby to cause said knife assembly to divide said dough into desired sections and hydraulic pressure means connected with said pressure plate automatically maintaining a constant downward pressure on said pressure plate when said container with the dough and said knife assembly are moved relatively toward each other, thereby causing said pressure plate to exert a constant pressure down on the dough while the dough is being divided by the knife assembly.

2. In a dough compressing and dividing device of the character described, a confining pan for dough, said pan having an open top, a pressure plate assembly positioned above said confining pan adapted to press down on the dough in said pan while covering the area within said pan, a stationary knife assembly above said pan, said knife assembly so arranged as to divide the dough in said pan into sections of equal area when said pan with said dough is thrust up against said knife assembly, said pressure plate assembly having slots for said knife assembly enabling said knife assembly to pass through said pressure plate assembly, means for moving said pan upwardly and thereby moving said dough against said knife assembly, whereby to cause said knife assembly to divide said dough into desired sections, supporting means for said plate assembly, said plate assembly movable upwardly in said supporting means, whereby said plate assembly will be moved upwardly when engaged by said dough upon the upward movement of said dough pan and dough by said first mentioned means, and means connected with said pressure plate assembly resisting the upward movement of said pressure plate assembly when said plate assembly is engaged by said dough with the upward movement of said dough against said knife assembly.

3. The combination set forth in claim 2, with said last mentioned means for said pressure plate assembly including a hydraulic cylinder and piston and an automatic control so constructed and arranged as to cause predetermined pressure to be exerted against said dough constantly as said dough engages said plate assembly with the upward movement of said dough against said stationary knife assembly.

4. In a dough compressing and dividing device of the character described, a circular confining pan for dough, said pan having an open top, a pressure plate assembly positioned above said dough confining pan adapted to press down on the dough in said pan while covering the area within said pan, a stationary knife assembly above said pan, said knife assembly comprising a central cylindrical knife and branch knives extending radially from said central knife, the bottom edges of said knife assembly located in the same horizontal plane, said knife assembly so arranged as to divide the dough in said pan into sections of equal area when said pan and said dough are moved upwardly against said knife assembly, said pressure plate assembly having slots for said knife assembly enabling said knife assembly to pass through said pressure plate assembly, means for moving said pan upwardly and thereby moving said dough against said knife assembly, whereby to cause said knife assembly to divide said dough into desired sections, supporting means for said plate assembly, said plate assembly movable upwardly in said supporting means, whereby said plate assembly will be moved upwardly when engaged by said dough when said dough pan and dough are moved upwardly by said first mentioned means, and means connected with said pressure plate assembly resisting the upward movement of said pressure plate assembly and so constructed and arranged as to cause predetermined pressure to be exerted constantly against said dough when said dough engages said plate assembly upon the upward movement of said dough and said pan against said stationary knife assembly.

5. A dough compressing and dividing device including a supporting frame, a confining pan for dough, said pan having an open top, a movable platform for said pan movable up and down in said frame, means for securing said pan in place on said platform, a pressure plate assembly positioned above said pan adapted to press down on the dough in said pan while covering the area within said pan, stationary knife assembly in said supporting frame above said platform and pan, said knife assembly so arranged as to divide the dough in said pan into sections of equal area when said platform and pan with said dough are thrust up against said knife assembly, said pressure plate assembly having slots for said knife assembly enabling said knife assembly to pass through said pressure plate assembly, means for moving said platform and said pan upwardly and thereby moving said dough against said knife assembly, supporting means for said plate assembly, said plate assembly movable upwardly in said supporting means, whereby said plate assembly will be moved upwardly when engaged by said dough when said dough pan and dough are moved upwardly against said knife assembly by said first mentioned means, and means connected with said pressure plate assembly resisting the upward movement of said pressure plate assembly when said plate assembly is engaged by said dough with the upward movement of said platform, pan and dough.

6. A dough compressing and dividing device including a supporting frame, a circular pan for dough, said pan having an open top, a movable platform for said pan movable up and down in said frame, means for securing said pan in place on said platform, a pressure plate assembly positioned above said dough pan adapted to press down on the dough in said pan while covering the area within said pan, a stationary knife assembly in said supporting frame above said platform and pan, said knife assembly comprising a central cylindrical knife and branch knives extending radially from said central knife, the bottom edges of said knife assembly extending in the same horizontal plane, said knife assembly so arranged as to divide the dough in said pan into sections of equal area when said pan and said dough are moved upwardly against said knife assembly, said pressure plate assembly having slots for said knife assembly enabling said knife assembly to pass through said pressure plate assembly, means for moving said platform and said pan upwardly and thereby moving said dough against said knife assembly, whereby to cause said knife assembly to divide said dough into desired sections of equal area, supporting means for said plate assembly, said plate assembly movable upwardly in said supporting means, whereby said plate assembly will be moved upwardly when engaged by said dough upon the upward movement of said platform, pan and dough, and means connected with said pressure plate assembly resisting the upward movement of said pressure plate assembly when engaged by said dough with the upward movement of said dough, said resilient means so constructed and arranged as to cause predetermined pressure to be exerted constantly against said dough as said dough engages said plate assembly with the upward movement of said dough against said stationary knife assembly.

References Cited
UNITED STATES PATENTS

| | | | |
|---|---|---|---|
| 536,830 | 4/1895 | Hetherington | 107—68 |
| 687,088 | 11/1901 | Van Houten | 107—68 |
| 1,189,022 | 6/1916 | Van Houten | 107—68 |
| 1,352,424 | 9/1920 | Abrams et al. | 107—68 |

ROBERT E. PULFREY, *Primary Examiner.*

J. D. BEIN, *Examiner.*